(12) United States Patent
Otake et al.

(10) Patent No.: US 6,924,918 B2
(45) Date of Patent: Aug. 2, 2005

(54) OPTICAL MODULATOR AND METHOD OF MANUFACTURING THE SAME

(75) Inventors: Fumio Otake, Yamanashi (JP); Haruhisa Soda, Hachioji (JP)

(73) Assignees: Fujitsu Quantum Devices Limited, Yamanashi (JP); Fujitsu Limited, Kawasaki (JP)

(*) Notice: Subject to any disclaimer, the term of this patent is extended or adjusted under 35 U.S.C. 154(b) by 60 days.

(21) Appl. No.: 10/660,746

(22) Filed: Sep. 12, 2003

(65) Prior Publication Data

US 2004/0052491 A1 Mar. 18, 2004

(30) Foreign Application Priority Data

Sep. 12, 2002 (JP) ........................................ 2002-267090

(51) Int. Cl.[7] ................................................ G02F 1/03
(52) U.S. Cl. .......................... 359/248; 359/254; 385/8
(58) Field of Search ................................ 359/248, 249, 359/254, 255, 315, 322; 385/2, 8

(56) References Cited

U.S. PATENT DOCUMENTS

2003/0190107 A1 * 10/2003 Walker .......................... 385/2

OTHER PUBLICATIONS

L. Möri et al.; "Traveling Wave Electrodes for 50 Ghz Operation of Opto–Electronic Devices Based on InP"; 11th International Conference on Indium Phosphide and Related Materials; Davos, Switzerland; May 16–20, 1999; pp. 385–388./Discussed in the specification.

"Low Voltage, 50Ω, GaAs/AlGaAs Travelling–Wave Modulator with Bandwidth Exceeding 25 GHz"; *Electronics Letters*; vol. 25; No. 23; Nov. 9, 1989; pp. 1549–1550./ Discussed in the specification.

* cited by examiner

Primary Examiner—Scott J. Sugarman
Assistant Examiner—Richard Hanig
(74) Attorney, Agent, or Firm—Westerman, Hattori, Daniels & Adrian LLP

(57) ABSTRACT

An optical modulator includes a p- or n-type semiconductor layer that is provided at an upper part of an optical waveguide path, and modulating electrodes that are provided at intervals on the semiconductor layer in an extension area of the optical waveguide path. The semiconductor layer has first regions located immediately under the modulating electrodes, and second regions located between the first regions. The second regions have separators that electrically separate the first regions from one another.

23 Claims, 7 Drawing Sheets

- ■ PRIOR ART 1
  :WHERE AN UNIFORM UNDOPED
  LAYER IS EMPLOYED AS UPPER
  CLADDING LAYER

- △ PRIOR ART 2
  WHERE AN UNIFORM CONDUCTIVE
  LAYER IS EMPLOYED AS UPPER
  CLADDING LAYER

- ● 1ST EMBODIMENT
  WHERE AN ELECTRICALLY
  SEGMENTED CONDUCTIVE LAYER
  IS EMPLOYED AS UPPER
  CLADDING LAYER

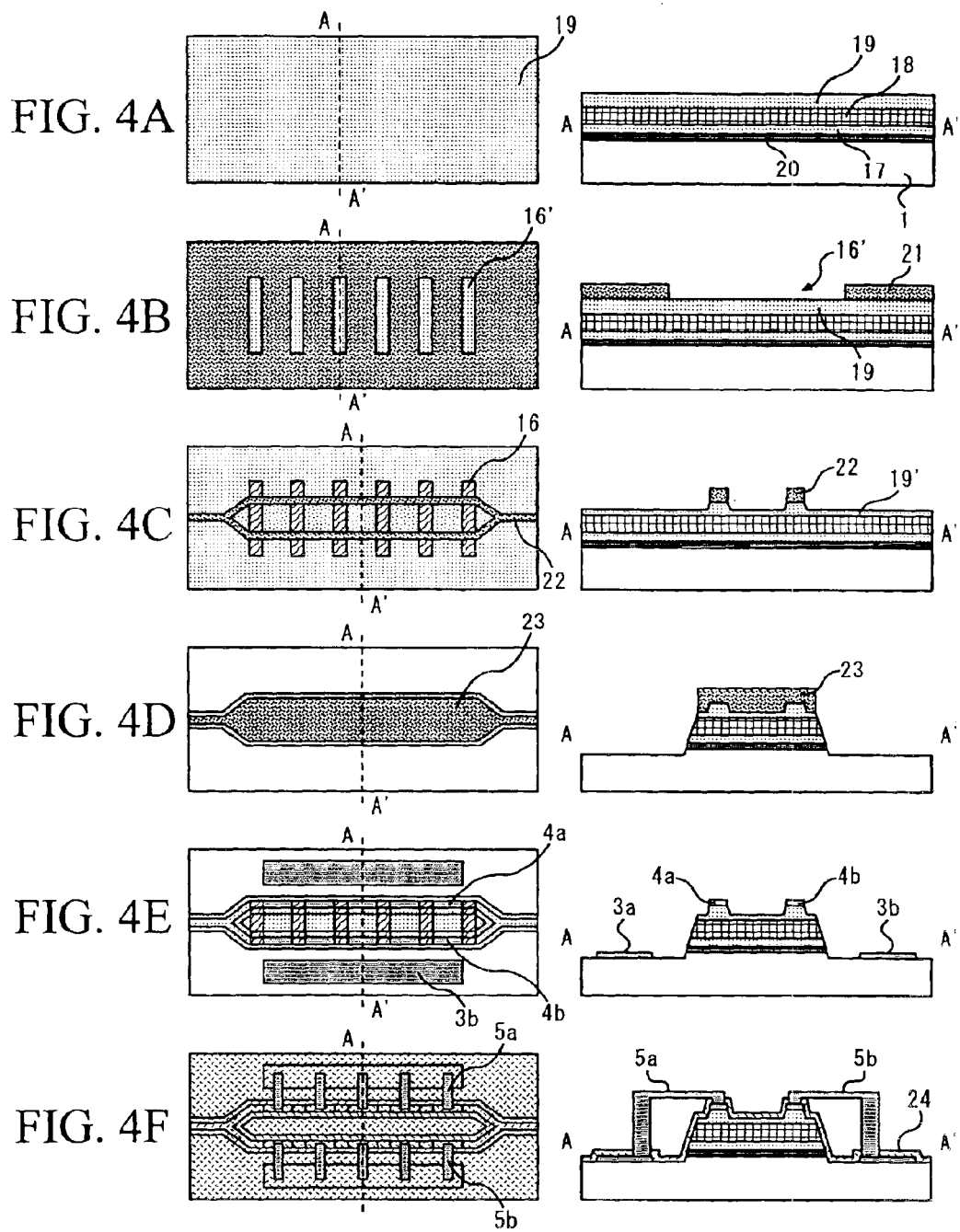

OPTICAL MODULATOR AND METHOD OF MANUFACTURING THE SAME

BACKGROUND OF THE INVENTION

1. Field of the Invention

The present invention generally relates to an optical modulator and a method of manufacturing the optical modulator, and more particularly, to an optical modulator having modulating electrodes and a method of manufacturing such an optical modulator.

2. Description of the Related Art

Traveling wave electrodes are normally employed for an optical modulator that is required to operate at 10 Gbps or higher. Such an optical modulator with traveling wave electrodes has a special electrode structure to improve the modulation band. This structure is disclosed by L. Mori, D. Hoffmann, K. Matzen, C. Bornholdt, G. G. Mekonnen, and F. Reier, in "Traveling Wave Electrodes for 50 GHz Operation of Opto-Electronic Device Based on InP, (11th International Conference on Indium Phosphide and Related Materials, Davos, Switzerland, pp. 385–388, 16–20 May, 1999)", or ELECTRONICS LETTERS $9^{th}$ November 1989 Vol. 25, No. 23, pp. 1549–1550. FIGS. 1A and 1B show such a structure as Prior Art 1.

FIG. 1A is a top view of a Mach-Zehnder optical modulator. As shown in FIG. 1A, the Mach-Zehnder optical modulator has an $n^+$-type GaAs layer 112 as a lower electrode layer on a semi-insulating GaAs (gallium arsenide) substrate 111. Further, an AlGaAs layer 114, a GaAs layer 115, and AlGaAs layers 105 and 106 are formed as an optical waveguide structure on the $n^+$-type GaAs layer 112.

The GaAs layer 115 located at the center of the optical waveguide structure is the core layer. The AlGaAs layers 114 and 105 (106) that sandwich the core layer are undoped cladding layers.

This Mach-Zehnder optical modulator includes traveling wave electrodes 101 and 102 that mainly transmit modulating signals, and modulating electrodes 103 and 104 that transmit modulating signals directly to light to be modulated. This structure eliminates the problem that the transmission rate of modulating signals being transmitted through the traveling wave electrodes 101 and 102 is normally higher than the transmission rate of light (to be modulated) being transmitted through the core layer. Since several modulating electrodes 103 (104) are allocated to the traveling wave electrode 101 (102), the transmission rate of modulating signals being transmitted through the traveling wave electrodes 101 and 102 can be reduced to equal the transmission rate of light to be modulated. This can be done because the modulating electrodes 103 and 104 serve as capacitive loads on the traveling wave electrodes 101 and 102, respectively.

The traveling wave electrodes 101 and 102 are electrically separated from each other by grooves 107 and 108 that are formed by trenching and reach the substrate 111 under the embedded $n^+$-type GaAs layer 112. Accordingly, the segmented modulating electrodes 103 and 104 are electrically connected to the traveling wave electrodes 101 and 102, respectively, with an air-bridge structure (117, 118).

With this particular structure, the transmission rate of modulating signals is equal to the transmission rate of light to be modulated in the Mach-Zehnder optical modulator shown in FIGS. 1A and 1B. Also, the characteristic impedance of the entire modulator is matched to a predetermined value that is normally 50 Ω.

In recent years, there has been an increasing demand for optical modulators with even higher performance. One of the highly demanded features is a lower operating voltage.

In Prior Art 1 shown in FIGS. 1A and 1B, however, there exist the undoped (or semi-insulating) cladding layers 105 and 106 between the core layer 115 and the modulating electrodes 103 and 104, respectively. Therefore, it is difficult to efficiently induce an electric field in the core layer 115 with modulating signals. To eliminate this difficulty, the cladding layers 105 and 106 are formed from conductive layers (this structure will be hereinafter referred to as Prior Art 2). In this structure, however, each neighboring modulating electrodes 103 (104) are connected to each other with the conductive cladding layer 105 (106), resulting in a large loss of a modulating signal and a difference in transmission rate between light to be modulated and modulating signals.

SUMMARY OF THE INVENTION

It is therefore an object of the present invention to provide an optical modulator and a method of manufacturing the optical modulator in which the above disadvantage is eliminated.

A more specific object of the present invention is to provide an optical modulator with a lower modulating voltage, and a method of manufacturing such an optical modulator.

The above objects of the present invention are achieved by an optical modulator comprising: a p- or n-type semiconductor layer that is provided at an upper part of an optical waveguide path; and a plurality of modulating electrodes that are provided at intervals on the semiconductor layer in an extension area of the optical waveguide path, the semiconductor layer having first regions located immediately under the modulating electrodes, and second regions located between the first regions, and the second regions having separators that electrically separate the first regions from one another.

The above objects of the present invention are also achieved by a method of manufacturing an optical modulator that has a plurality of modulating electrodes provided at intervals on a semiconductor layer in an extension area of an optical waveguide path, the method comprising the step of forming separators in second regions situated between first regions on which the plurality of modulating electrodes are located, the separators electrically separating the first regions from one another.

The above objects of the present invention are also achieved by a method of manufacturing an optical modulator that has a plurality of modulating electrodes provided at intervals on first regions in an extension area of an optical waveguide path, the method comprising the step of forming second regions between the first regions on which the plurality of modulating electrodes are formed, the second regions having the opposite conductivity type to the first regions.

The above objects of the present invention are also achieved by a method of manufacturing an optical modulator that has a plurality of modulating electrodes provided at intervals on a semiconductor layer in an extension area of an optical waveguide path, the method comprising the step of forming bias electrodes in regions between first regions in the semiconductor layer on which the plurality of modulating electrodes are formed, the bias electrodes applying bias voltage.

BRIEF DESCRIPTION OF THE DRAWINGS

Other objects, features and advantages of the present invention will become more apparent from the following detailed description when read in conjunction with the accompanying drawings, in which:

FIGS. 4A through 4F illustrate the process of manufacturing the optical-modulator in accordance with the first embodiment of the present invention;

DESCRIPTION OF THE PREFERRED EMBODIMENTS

The following is a description of preferred embodiments of the present invention, with reference to the accompanying drawings.

(First Embodiment)

Figure 1A:
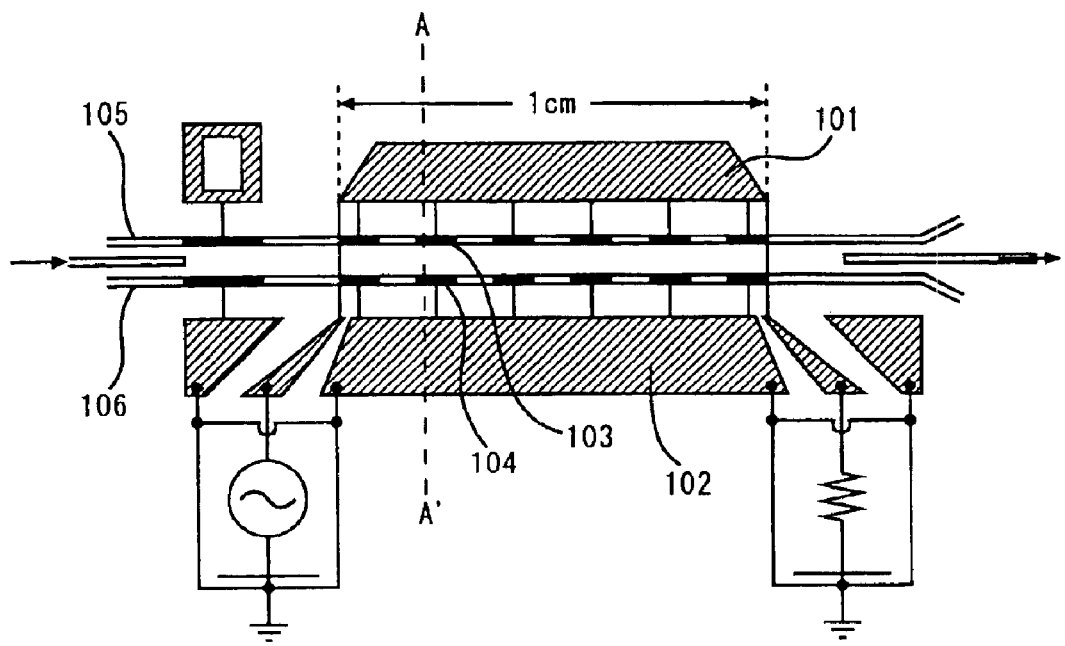
FIG. 1A is a top view of a conventional Mach-Zehnder optical modulator.
Figure 1B:
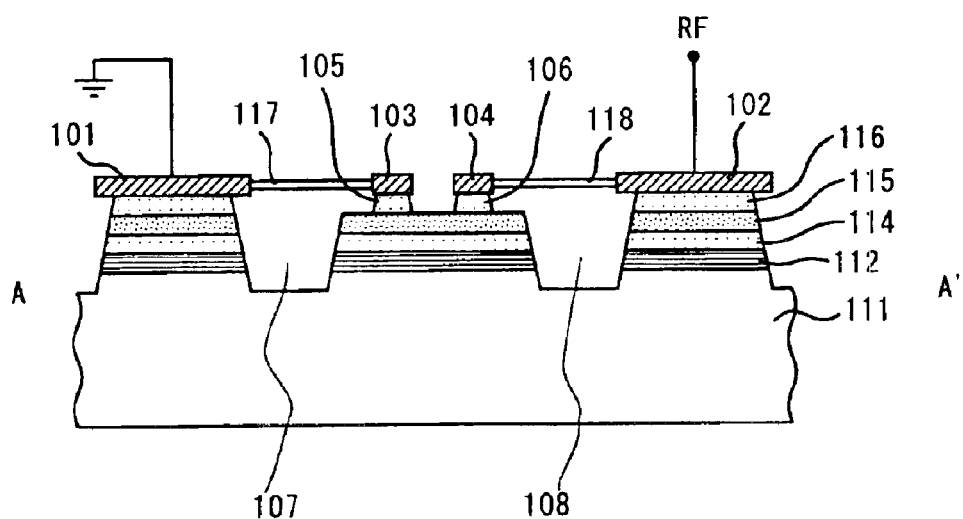
FIG. 1B is a section view of the optical modulator, taken along the line A–A' of FIG. 1A.
Figure 2A:
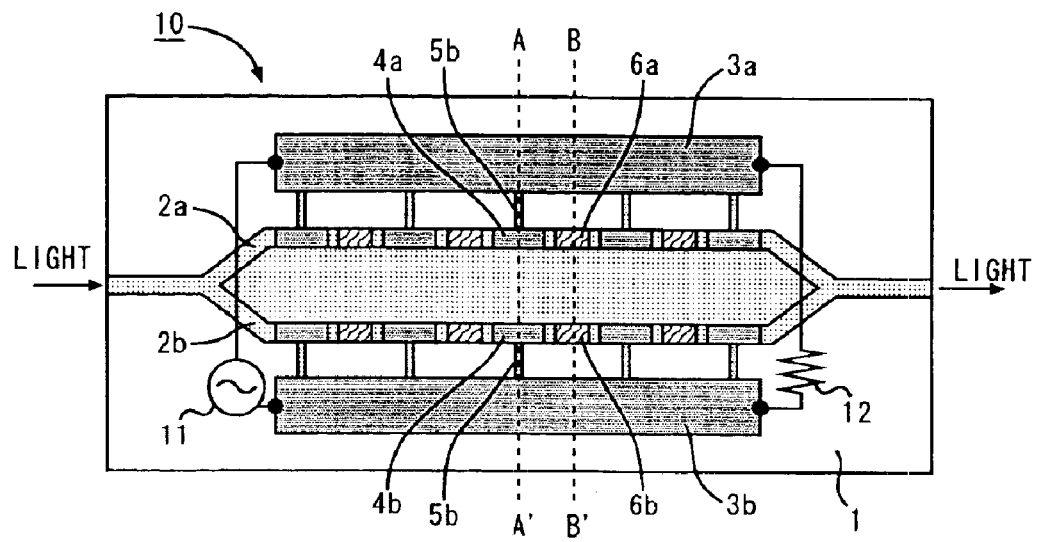
FIG. 2A is a top view of an optical modulator in accordance with a first embodiment of the present invention.
Figure 2B:
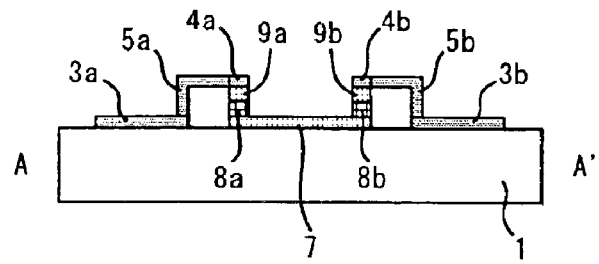
FIG. 2B is a section view of the optical modulator, taken along the line A–A' of FIG. 2A.
Figure 2C:
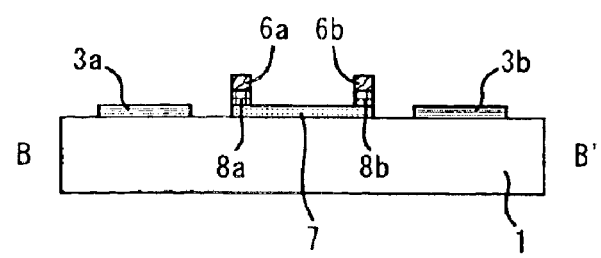
FIG. 2C is a section view of the optical modulator, taken along the line B–B' of FIG. 2A.

FIGS. 2A through 2C illustrate the structure of an optical modulator 10 in accordance with a first embodiment of the present invention. More specifically, FIG. 2A is a top view of the optical modulator 10. FIG. 2B is a section view of the optical modulator 10, taken along the line A–A' of FIG. 2A. FIG. 2C is a section view of the optical modulator 10, taken along the line B–B' of FIG. 2A.

As can be seen from FIG. 2A, the optical modulator 10 of this embodiment has a Mach-Zehnder structure in which inputted light branches into optical waveguide paths 2a and 2b. In the following description, the structure on the side of the optical waveguide path 2b will not be described, but it is the same as the structure on the side of the optical waveguide path 2a.

As is apparent from the A–A' section view shown in FIG. 2B, the optical waveguide path 2a has a high-mesa structure in which a core layer 8a that transmits light to be modulated is sandwiched by a lower cladding layer 7 and an upper cladding layer 9a. In this embodiment, the lower cladding layer 7 is a conductive layer, and the core layer 8a is a semi-insulating semiconductor layer.

Segmented modulating electrodes 4a are provided at intervals on the optical waveguide path 2a. Each of the modulating electrodes 4a is connected to a traveling wave electrode 3a via an air bridge 5a.

The upper cladding layer 9a can be divided into two types of regions: first regions located immediately below the modulating electrodes 4a and second regions located between the first regions. The first regions are conductive layers. In contrast, each of the second regions is formed from an i-type semiconductor with a resistivity of $10^2$ Ω·cm or higher in a high-resistance area, so that the first regions are electrically separated from one another. In this embodiment, the high-resistance areas are referred to as separators 6a. The high-resistance separators 6a are formed by a known technique, such as ion implantation using dopants, which will be later described in conjunction with the process for manufacturing the optical modulator. Accordingly, the upper cladding layer 9a of this embodiment is partially turned into the high-resistance areas by ion implantation or the like (see FIG. 2C).

As described above, the first regions located immediately below the segmented modulating electrodes 4a are electrically separated from one another in the upper cladding layer 9a, so that an electric field can be efficiently induced in the core layer 8a with modulated signals. Accordingly, an electric field can be induced with a lower modulating voltage in the core layer 8a that confines light.

Figure 3:
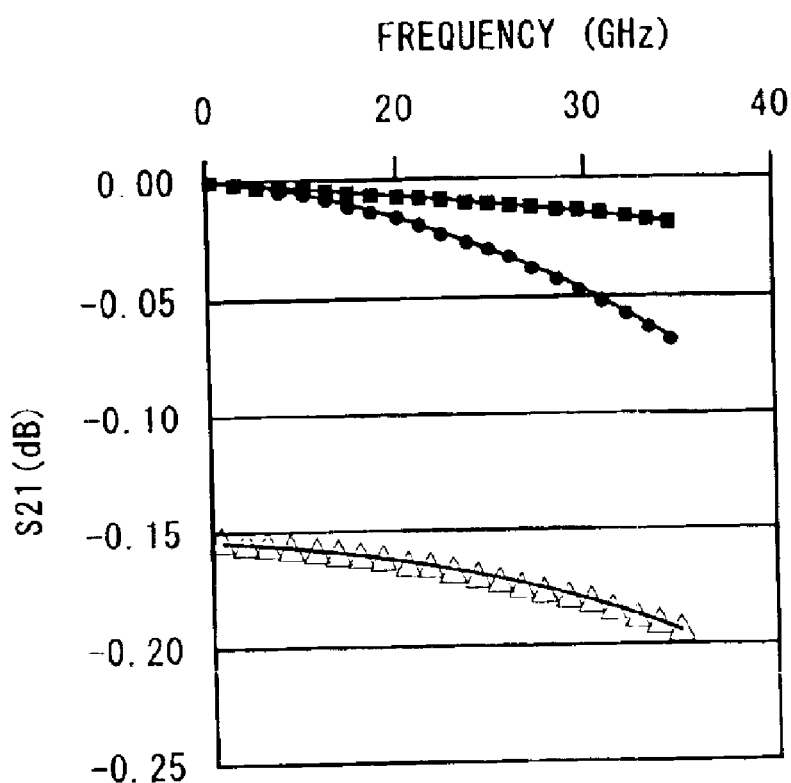
FIG. 3 is a graph showing comparisons between the modulating signal loss caused in the optical modulator of the first embodiment of the present invention and the modulating signal losses caused in the conventional optical modulators.

In accordance with this embodiment, it is possible to reduce the loss of high-frequency modulation signals and to reduce the modulating voltage, as described above. FIG. 3 shows comparisons between the effects of the present invention and the effects of Prior Art 1 and Prior Art 2. In the comparisons shown in FIG. 3, a symbol S21 represents a forward-transmission gain. As is apparent from FIG. 3, S21 is greatly improved by this embodiment, compared with Prior Art 2 that employs a conductive layer as the cladding layer.

Referring next to FIGS. 4A through 4F, the process for manufacturing the Mach-Zehnder optical modulator 10 of this embodiment will be described in detail. FIGS. 4A through 4F illustrate the process for manufacturing the optical modulator 10 having the ridge-type optical waveguide structure shown in FIGS. 2A through 2C.

First, a semiconductor layer 20 of n-type conductivity (hereinafter referred to as the "n-type semiconductor layer 20") is grown on a semi-insulating semiconductor substrate 1. An n-type lower cladding layer 17, an undoped core layer 18, and a p-type upper cladding layer 19 are then grown in this order on the n-type semiconductor layer 20. Here, the semi-insulating semiconductor substrate 1 may be made of undoped GaAs (gallium arsenide), for example.

The n-type semiconductor layer 20 is formed by growing n$^+$-type GaAs to have a thickness of approximately 0.5 μm on the semi-insulating GaAs substrate 1 by an epitaxial growth technique. The lower cladding layer 17 is formed by growing n$^+$-type $Al_{0.2}Ga_{0.8}As$ (aluminum gallium arsenide) to have a thickness of approximately 0.5 μm on the n-type semiconductor layer 20 by an epitaxial growth technique. The core layer 18 is formed by growing undoped GaAs to have a thickness of approximately 0.5 μm on the lower cladding layer 17 by an epitaxial growth technique. The upper cladding layer 19 is formed by growing p$^+$-type $Al_{0.2}Ga_{0.8}As$ to have a thickness of approximately 1.0 μm on the core layer 18 by an epitaxial growth technique. Here, the lower cladding layer 17 and the upper cladding layer 19 each contains AlGaAs with an Al composition of 0.3% or smaller. In this manner, a $p^+$-type AlGaAs/GaAs/$n^+$-type AlGaAs optical waveguide epitaxial GaAs wafer having an $n^+$-type GaAs layer at the lower side is produced, as shown in FIG. 4A.

After forming the wafer, a resist pattern 21 is then formed, as shown in FIG. 4B. The resist pattern 21 serves to implant predetermined ions into the second regions located between the first regions of the upper cladding layer 19 on which the modulating electrodes 4a and 4b are formed. More specifically, the resist pattern 21 formed on the upper cladding layer 19 has openings 16' at locations corresponding to the separators 6a and 6b (the second regions) of the upper cladding layer 19. Oxygen ions are then implanted into the upper cladding layer 19 through the openings 16' by an ion implantation technique. By doing so, the second regions of the upper cladding layer 19 become high-resistance regions to insulate and electrically separate the first regions from one another. Where a III–V compound semiconductor is employed in this embodiment, dopants that can be used in the ion implantation include oxygen (O), boron (B), iron (Fe), and ruthenium (Ru). After implanting oxygen ions and removing the resist pattern 21, annealing is performed on the upper cladding layer 19, thereby compensating for damage in crystals.

A resist pattern 22 for forming the optical waveguide paths 2a and 2b is then formed on the upper cladding layer 19. The parts of the upper cladding layer 19 not having the resist pattern 22 formed thereon are removed by a wet etching technique, as shown in FIG. 4C. After that, a resist pattern 23 for shaping the optical waveguide paths 2a and 2b is formed, and the parts of the wafer not having the resist pattern 23 formed thereon are removed by a wet etching technique, with the semi-insulating semiconductor substrate 1 being left. In this manner, the optical waveguide structure is completed, as shown in FIG. 4D.

After the formation of the optical waveguide paths 2a and 2b, the traveling wave electrodes 3a and 3b and the modulating electrodes 4a and 4b are formed using gold (Au). The traveling wave electrodes 3a and 3b and the modulating electrodes 4a and 4b are electrically connected by the air bridges 5a and 5b made of gold. The formation of the traveling wave electrodes 3a and 3b, the modulating electrodes 4a and 4b, and the air bridges 5a and 5b, is performed by a deposition technique and a plating technique. The use of gold reduces the loss of millimeter waves that are modulating signals. The wafer produced in the above manner should be protected by a protection film 24. This protection film 24 may be made of SiN (silicon nitrogen).

In the above structure, the upper cladding layer 19 formed by a p-type conductive layer has parts (the second regions) processed to have a higher resistivity by an ion implantation technique, so that the structure shown in FIGS. 2A and 2B can be realized. However, it is also possible to obtain the same structure by forming the upper cladding layer 19 with an undoped semi-insulating semiconductor layer, and then turning part of the upper cladding layer 19 (the first regions) into conductive regions by an ion implantation technique. Dopants that can be used in that case include zinc (Zn), magnesium (Mg), silicon (Si), sulfur (S), and selenium (Se).

When a dopant is introduced, it is possible to utilize a diffusion technique, instead of the ion implanting technique. It is also possible to obtain the same structure by forming high-resistance layers or conductive layers in the corresponding regions by an epitaxial growth technique.

(Second Embodiment)

Figure 5A:
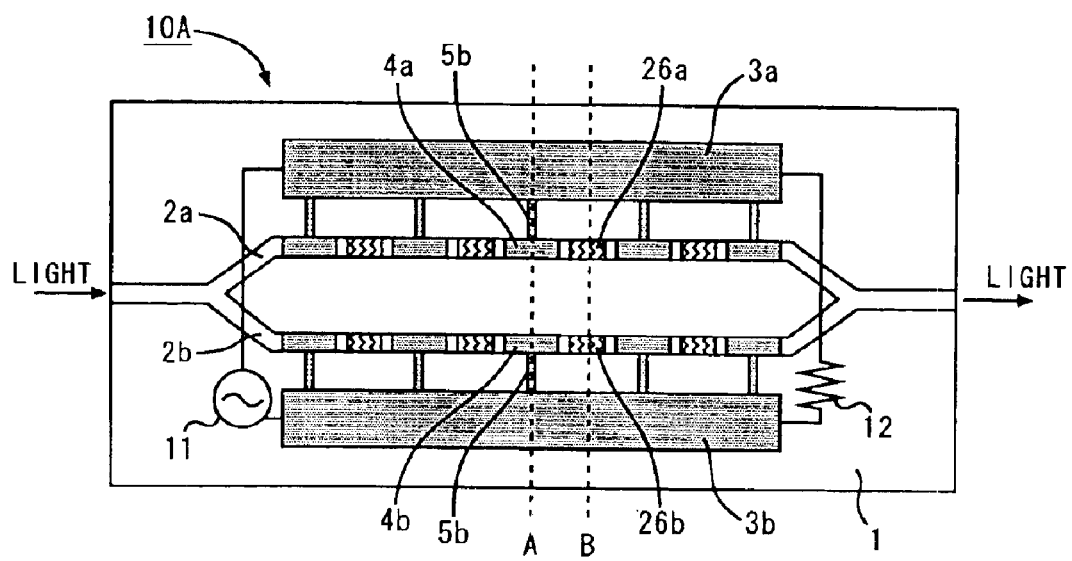
FIG. 5A is a top view of an optical modulator in accordance with a second embodiment of the present invention.
Figure 5B:
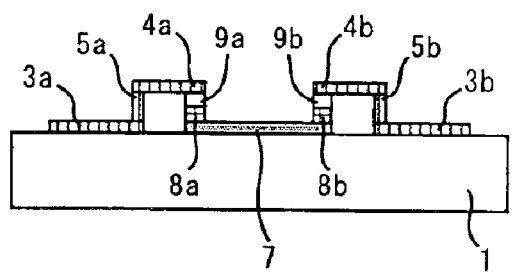
FIG. 5B is a section view of the optical modulator, taken along the line A–A' of FIG. 5A.
Figure 5C:
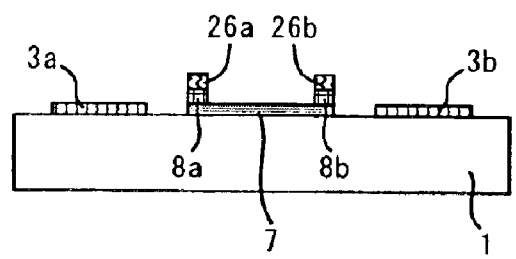
FIG. 5C is a section view of the optical modulator, taken along the line B–B' of FIG. 5A.

Referring now to FIGS. 5A through 5C, a second embodiment of the present invention will be described in detail. In the first embodiment, each of the second regions located between the first regions on which the segmented modulating electrodes 4a and 4b are formed has a high resistivity so as to electrically separate the first regions from one another. In this embodiment, on the other hand, the second regions have the opposite conductivity type to the first regions, so that the first regions can be electrically separated from one another.

FIGS. 5A through 5C illustrate a Mach-Zehnder optical modulator 10A in accordance with this embodiment. FIG. 5A is a top view of the optical modulator 10A. FIG. 5B is a section view of the optical modulator 10A, taken along the line A–A' of FIG. 5A. FIG. 5C is a section view of the optical modulator 10A, taken along the line B–B' of FIG. 5.

In this embodiment, separators 26a and 26b in the upper cladding layers 9a and 9b have the opposite conductivity type to the rest of the upper cladding layers 9a and 9b (i.e., the first regions). If the first regions in the upper cladding layers 9a and 9b are formed from p-type semiconductor layers, the separators 26a and 26b are formed from n-type semiconductor layers. The conductivity types may be reversed.

As the separators 26a and 26b have the opposite conductivity type to the first regions, the first regions are electrically separated from one another, and an electric field can be efficiently induced in the core layers 8a and 8b with modulating signals. These are the same effects as those obtained from the first embodiment. Accordingly, an electric field to be induced in the core layers 8a and 8b that confine light can be induced with a lower modulating voltage.

The optical modulator 10A of this embodiment can be produced by the same manufacturing process as that of the first embodiment. However, in the formation of the separators 26a and 26b by an ion implantation technique, a diffusion technique, and an epitaxial growth technique, the second regions are made to have the opposite conductivity type to the first regions in the upper cladding layers 9a and 9b. The other aspects of this embodiment are the same as those of the first embodiment, and therefore, explanation of them is omitted in this description.

(Third Embodiment)

Figure 6A:
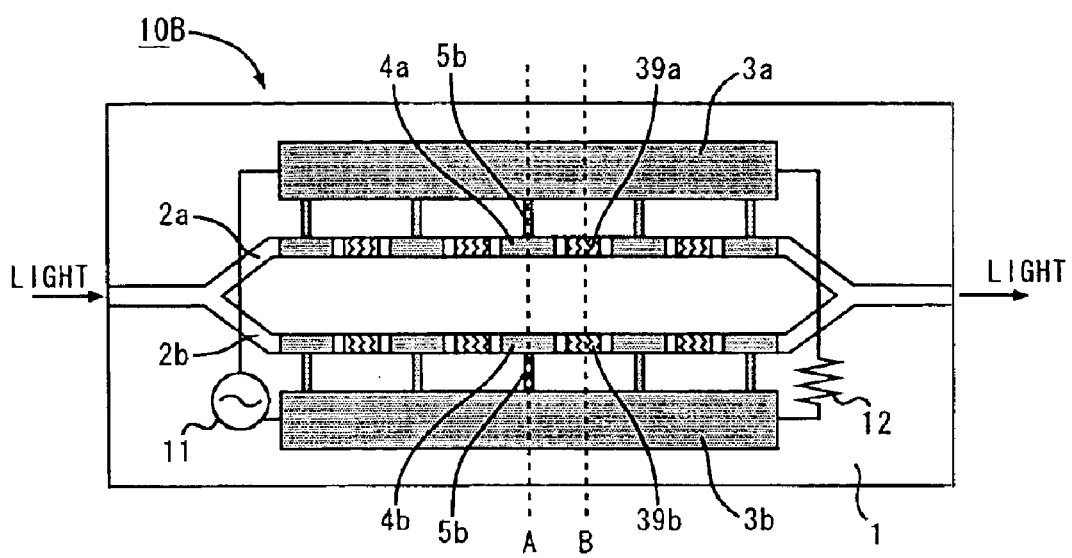
FIG. 6A is a top view of an optical modulator in accordance with a third embodiment of the present invention.
Figure 6B:
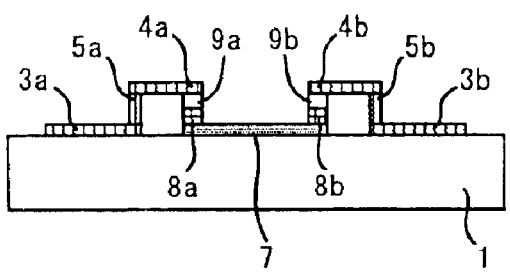
FIG. 6B is a section view of the optical modulator, taken along the line A–A' of FIG. 6A.
Figure 6C:
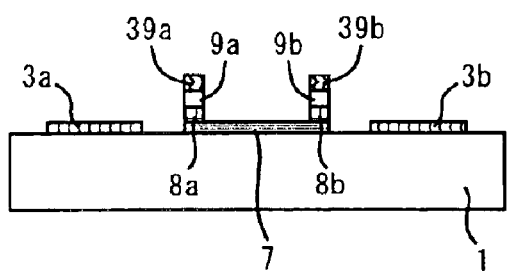
FIG. 6C is a section view of the optical modulator, taken along the line B–B' of FIG. 6A.

Referring now to FIGS. 6A through 6C, a third embodiment of the present invention will be described in detail. In this embodiment, the second regions are depleted, so that the first regions can be electrically separated from one another.

To realize such a structure, semiconductor layers 39a and 39b with the opposite conductivity type to the upper cladding layers 9a and 9b are formed over the second regions. With this structure, semiconductor layers of the opposite conductivity type are brought into contact with the second regions, thereby creating pn junctions. Thus, the second regions in the cladding layers 9a and 9b can be depleted, with no additional voltage being applied. The first regions are then electrically separated from one another by the depleted second regions, so that an electric field created by modulating signals can be efficiently induced in the core layers 8a and 8b. With this structure, the electric field to be induced in the core layers 8a and 8b that confine light can be induced with a lower modulating voltage.

FIGS. 6A through 6C illustrate a Mach-Zehnder optical modulator 10B in accordance with this embodiment. FIG. 6A is a top view of the optical modulator 10B. FIG. 6B is a section view of the optical modulator 10B, taken along the line A–A' of FIG. 6A. FIG. 6C is a section view of the optical modulator 10B, taken along the line B–B' of FIG. 6A.

The optical modulator 10B of this embodiment can be produced by the same manufacturing process as that of the first embodiment, except that the step of forming the semiconductor layers 39a and 39b is added to the process. The other aspects of this embodiment are the same as those of the first embodiment, and therefore, explanation of them is omitted in this description.

(Fourth Embodiment)

Figure 7A:
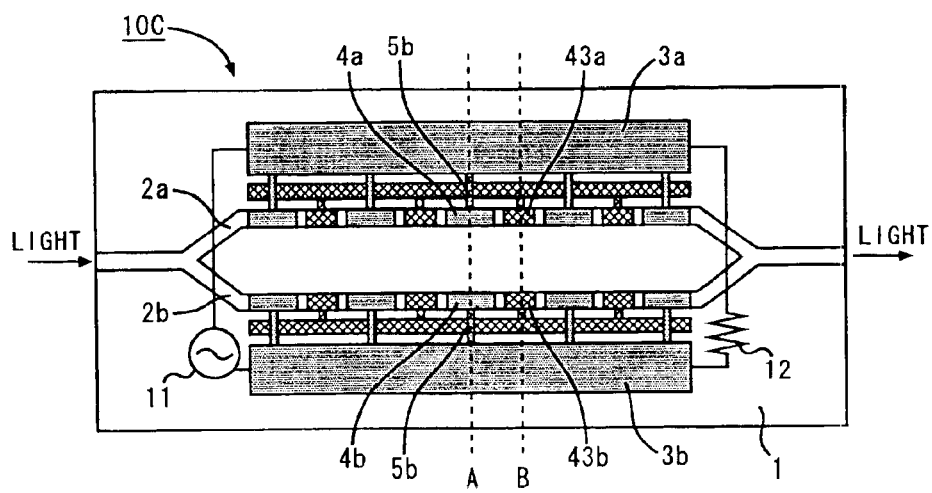
FIG. 7A is a top view of an optical modulator in accordance with a fourth embodiment of the present invention.
Figure 7B:
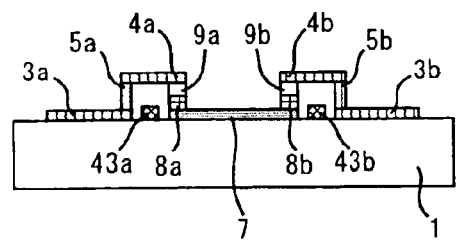
FIG. 7B is a section view of the optical modulator, taken along the line A–A' of FIG. 7A.
Figure 7C:
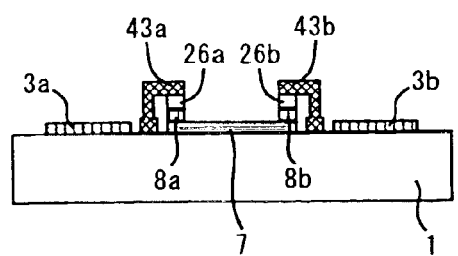
FIG. 7C is a section view of the optical modulator, taken along the line B–B' of FIG. 7A.

Referring now to FIGS. 7A through 7C, a fourth embodiment of the present invention will be described in detail. In this embodiment, the second regions are depleted, as they are in the third embodiment.

To realize such a structure, metal electrodes 43a and 43b are formed to apply reverse bias to the second regions. By applying reverse bias to the second regions, the second regions are depleted so as to electrically separate the first regions from one another. Accordingly, an electric field formed by modulating signals can be efficiently induced in the core layers 8a and 8b. Thus, the electric field to be induced in the core layers 8a and 8b that confine light can be induced with a lower modulating voltage.

FIGS. 7A through 7C illustrate the structure of a Mach-Zehnder optical modulator 10C in accordance with this embodiment. FIG. 7A is a top view of the optical modulator 10C. FIG. 7B is a section view of the optical modulator 10C, taken along the line A–A' of FIG. 7A. FIG. 7C is a section view of the optical modulator 10C, taken along the line B–B' of FIG. 7A.

In this embodiment, a thin insulating film may be formed on each of the upper cladding layers 9a and 9b, and the metal electrodes 43a and 43b for inducing reverse bias may be formed on the thin insulating film. With this structure, the same effects as described above can also be achieved.

(Other Embodiments)

As the present invention is aimed at effectively inducing an electric field in light-enclosing core layers by applying voltage to modulating electrodes, it is also possible to employ a multi-layer cladding structure that includes undoped layers and conductive layers, with the undoped layers being provided at the core side of the cladding layers. With such a multi-layer cladding structure, the capacitive components of the segmented modulating electrodes can be adjusted, and the light loss due to light filtered through the core layers into the cladding layers can be reduced. Thus, the transmission rate of high-frequency modulating signals can be efficiently matched to the transmission rate of light, thereby satisfying the characteristic requirement other than a reduction in operating voltage.

The compound semiconductor employed in the foregoing embodiments contains at least one of the following materials: gallium (Ga), arsenic (As), antimony (Sb), aluminum (Al), indium (In), phosphorus (P), nitrogen (N), zinc (Zn), cadmium (Cd), selenium (Se), and sulfur (S). However, the same structure can be obtained with a silicon-based semiconductor that contains at least one of the three materials: silicon (Si), germanium (Ge), and carbon (C).

Although a few preferred embodiments of the present invention have been shown and described, it would be appreciated by those skilled in the art that changes may be made in these embodiments without departing from the principles and spirit of the invention, the scope of which is defined in the claims and their equivalents.

The present application is based on Japanese Patent Application No. 2002-267090 filed on Aug. 12, 2003, the entire disclosure of which is hereby incorporated by reference.

What is claimed is:

1. An optical modulator comprising:
   a p- or n-type semiconductor layer that is provided at an upper part of an optical waveguide path; and
   a plurality of modulating electrodes that are provided at intervals on the semiconductor layer in an extension area of the optical waveguide path,
   the semiconductor layer having first regions located immediately under the modulating electrodes, and second regions located between the first regions, and
   the second regions having separators that electrically separate the first regions from one another.

2. The optical modulator as claimed in claim 1, wherein the separators have a higher resistivity than the first regions.

3. The optical modulator as claimed in claim 2, wherein the separators are formed from i-type semiconductors.

4. The optical modulator as claimed in claim 2, wherein the separators are doped with at least one element selected from the group consisting of oxygen, nitrogen, boron, iron, chromium, and ruthenium.

5. The optical modulator as claimed in claim 1, wherein the separators have the opposite conductivity type to the first regions.

6. The optical modulator as claimed in claim 1, wherein the separators are depletion regions in the semiconductor layer.

7. The optical modulator as claimed in claim 6, further comprising
   electrodes for applying bias voltage to the second regions,
   wherein the depletion regions are formed by virtue of the bias voltage applied by the electrodes.

8. The optical modulator as claimed in claim 6, further comprising
   reverse conductivity semiconductor layers that are formed on the second regions and have the opposite conductivity type to the second regions,
   wherein the depletion regions are formed by pn junctions between the second regions and the reverse conductivity semiconductor layers.

9. The optical modulator as claimed in claim 1, wherein at least one of the optical waveguide path and the semiconductor layer is formed from a compound semiconductor.

10. The optical modulator as claimed in claim 9, wherein the compound semiconductor contains at least one element selected from the group consisting of gallium, arsenic, antimony, aluminum, indium, phosphorus, nitrogen, zinc, cadmium, selenium, and sulfur.

11. The optical modulator as claimed in claim 1, wherein at least one of the optical waveguide path and the semiconductor layer is formed from a silicon-based semiconductor.

12. The optical modulator as claimed in claim 11, wherein the silicon-based semiconductor contains at least one element selected from the group consisting of silicon, germanium, and carbon.

13. A method of manufacturing an optical modulator that has a plurality of modulating electrodes provided at intervals on a semiconductor layer in an extension area of an optical waveguide path,
   the method comprising the step of
   forming separators in second regions situated between first regions on which the plurality of modulating electrodes are located, the separators electrically separating the first regions from one another.

14. The method as claimed in claim 13, wherein the separators have a higher resistivity than the first regions.

15. The method as claimed in claim 14, wherein the separators are formed from i-type semiconductors.

16. The method as claimed in claim 14, wherein the second regions in which the separators are to be formed are doped with at least one element selected from the group consisting of oxygen, nitrogen, boron, iron, chromium, and ruthenium.

17. The method as claimed in claim 13, wherein the separators have the opposite conductivity type to the first regions.

18. A method of manufacturing an optical modulator that has a plurality of modulating electrodes provided at intervals on first regions in an extension area of an optical waveguide path, the method comprising the step of forming second regions between the first regions on which the plurality of modulating electrodes are formed, the second regions having the opposite conductivity type to the first regions.

19. A method of manufacturing an optical modulator that has a plurality of modulating electrodes provided at intervals on a semiconductor layer in an extension area of an optical waveguide path, the method comprising the step of forming bias electrodes in regions between first regions in the semiconductor layer on which the plurality of modulating electrodes are formed, the bias electrodes applying bias voltage.

20. The method as claimed in claim 13, wherein at least one of the optical waveguide path and the semiconductor layer is formed from a compound semiconductor.

21. The method as claimed in claim 20, wherein the compound semiconductor contains at least one element selected from the group consisting of gallium, arsenic, antimony, aluminum, indium, phosphorus, nitrogen, zinc, cadmium, selenium, and sulfur.

22. The method as claimed in claim 13, wherein at least one of the optical waveguide path and the semiconductor layer is formed from a silicon-based semiconductor.

23. The method as claimed in claim 22, wherein the silicon-based semiconductor contains at least one element selected from the group consisting of silicon, germanium, and carbon.

\* \* \* \* \*